United States Patent Office 3,494,176
Patented Feb. 10, 1970

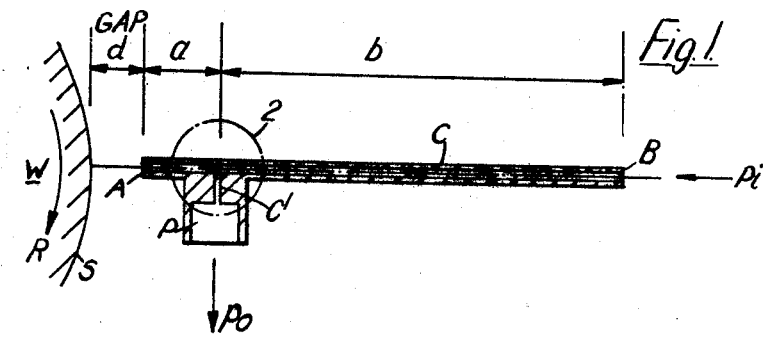
Fig. 1
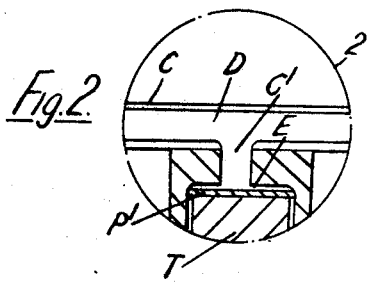
Fig. 2
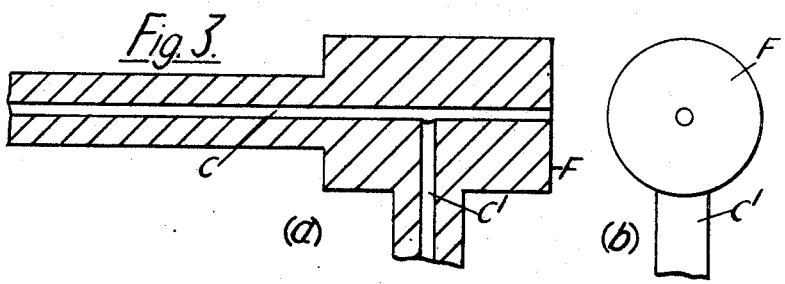
Fig. 3
| MAXIMUM OR CUT-OFF FREQUENCY $f_m$ | | | | | |
|---|---|---|---|---|---|
| 15 | 60 | 65 | 70 | 105 | 10 |
| 10 | 55 | 60 | 60 | 70 | 40 |
| 0.020 | 0.033 | 0.038 | 0.043 | 0.070 | BORE inch / p.s.i. $p_i$ |
Fig. 7

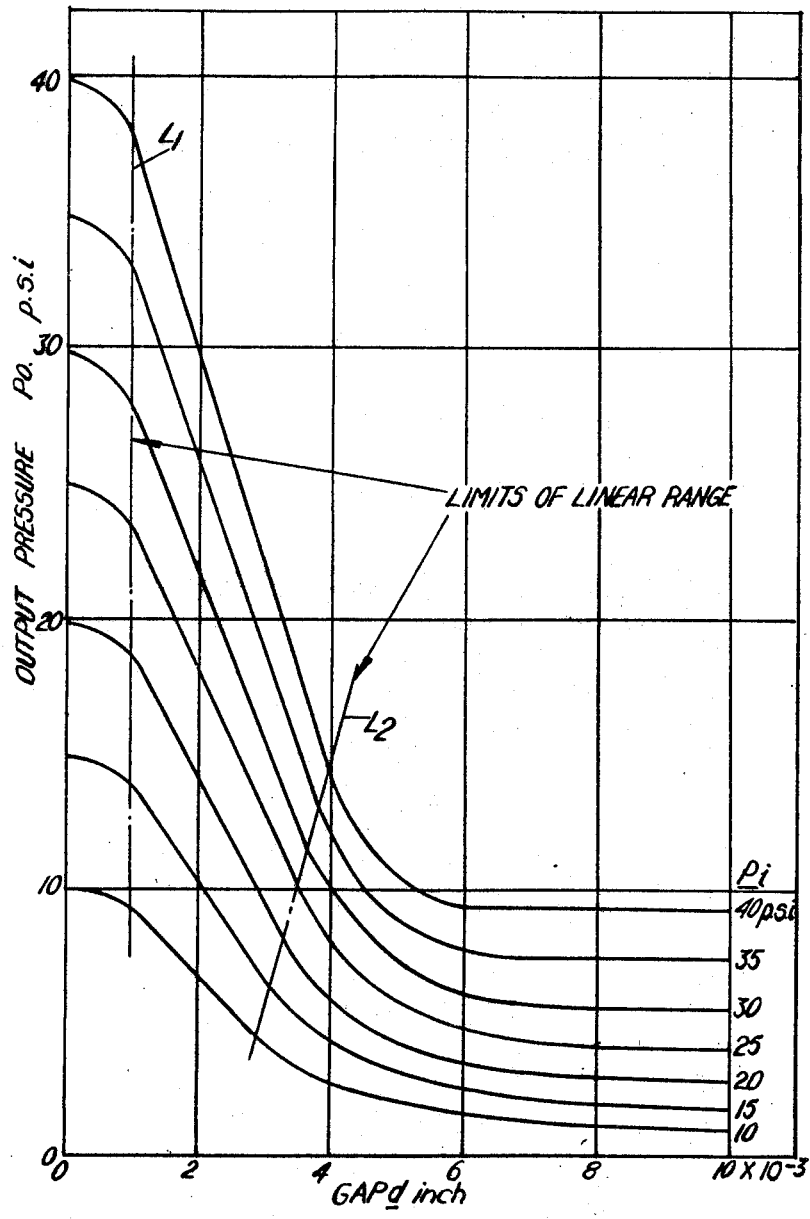

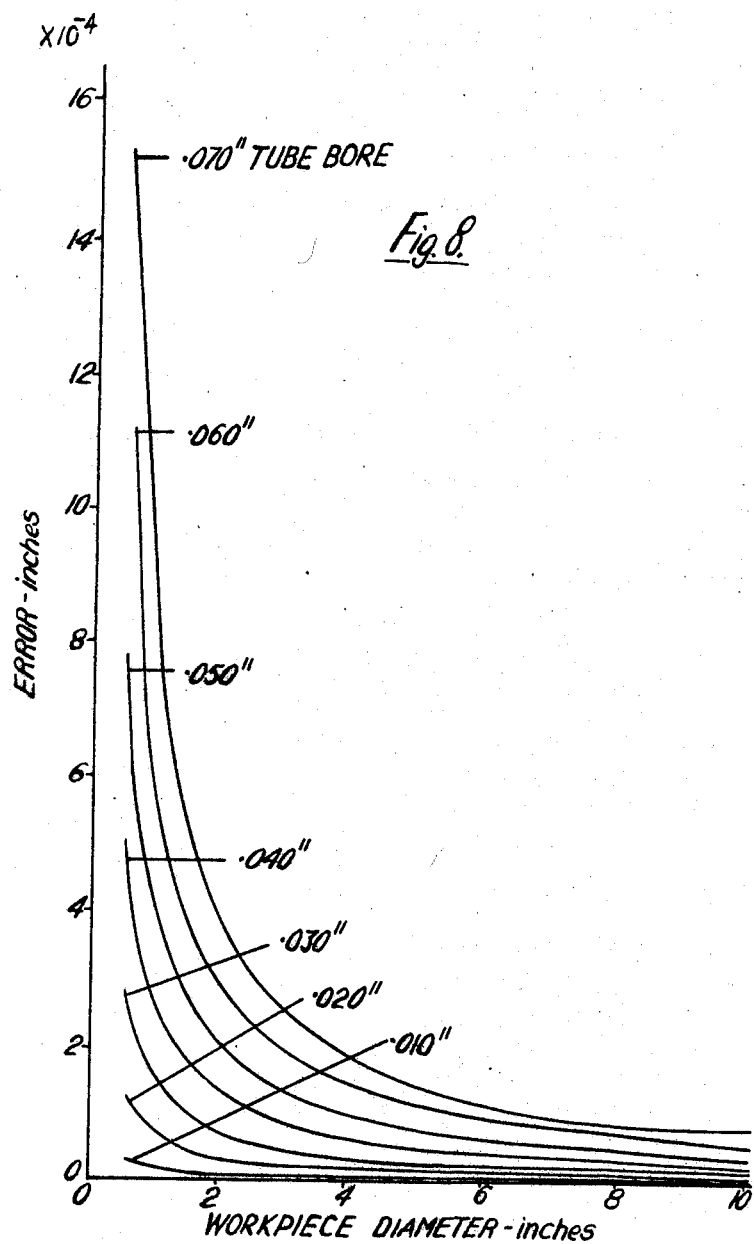

3,494,176
PROXIMITY GAUGES
Royds Sharp and Malcolm Bath, Glasgow, Scotland, assignors to National Research Development Corporation, London, England, a British corporation
Filed Sept. 7, 1967, Ser. No. 666,083
Claims priority, application Great Britain, Sept. 8, 1966, 40,239/66
Int. Cl. G01b 13/08
U.S. Cl. 73—37.5    4 Claims

ABSTRACT OF THE DISCLOSURE

A proximity gauge is described in which fluid (e.g. compressed air) under pressure is directed through a capillary tube on to a surface to be tested. The "back pressure" at a predetermined point in the capillary tube is measured to give an indication of the spacing between the open end of the tube and said surface. The gauge has a sharp response to changes in the relative position of the surface due, for example, to irregularities.

---

This invention comprises improvements in or relating to proximity gauges.

There is provided according to the invention a proximity gauge comprising a capillary tube having an open end which may be spaced from a surface to be gauged, the said capillary tube including a bore having a diameter within the range of from about 0.01 inch to about 0.09 inch, means for supplying fluid under pressure to said capillary tube to direct fluid on to said surface through said open end, and pressure responsive means connected to said capillary tube and adapted to indicate the fluid pressure or changes in the fluid pressure at a predetermined point in said capillary tube.

By employing a capillary tube in the manner defined above the method of testing and proximity gauge according to the present invention have certain advantages compared with conventional proximity gauges which employ the technique of directing a fluid jet onto the surface to be gauged. In the first place, the area of the surface on which the fluid impinges is relatively small by virtue of the small bore of the capillary tube. This renders the gauge more accurate, since the pressure indication is relatively unaffected by curvature of the surface. It has also been found, as will be seen from the following description, that the gauge according to the present invention is capable of improved response.

The gauge according to the invention is preferably constructed so that said predetermined point is disposed adjacent the open end of the capillary tube.

According to one embodiment the pressure responsive means may comprise a transducer adapted to produce an electrical signal representative of the fluid pressure applied thereto.

The pressure responsive means may alternatively comprise a fluid jet element, the fluid pressure at said point in the capillary tube constituting a control pressure of said fluid jet element. The term "fluid jet element" as used herein is intended to include devices, sometimes referred to as "fluid logic devices," in which the deflection of a fluid jet is controlled by one or more control pressures. Such devices may be adapted for bistable operation, in which the fluid jet is moved between two stable positions in response to change in a control pressure, or may be adapted for proportional operation, in which the jet is moved in a smooth transition from one position to another in dependence on a control pressure. In either mode of operation, the output of the device, which may for example be a pressure induced by the fluid jet, will be indicative of the control pressure.

The invention also includes a proximity gauge constructed and arranged substantially as herein described with reference to and as shown in the accompanying drawings, which illustrate the invention by way of example only. In these drawings:

FIGURE 1 is a diagrammatic representation of a proximity gauge according to one embodiment of the invention;

FIGURE 2 is a diagrammatic sectional view on an enlarged scale of the portion of FIGURE 1 enclosed within the circle 2 of FIGURE 2;

FIGURES 3a and 3b are a diagrammatic longitudinal section and an end view respectively of a proximity gauge according to a modification of the invention;

FIGURES 4 and 5 illustrate graphically characteristics of proximity gauges according to the invention;

FIGURE 7 is a table showing the cut-off frequencies of typical gauges according to the invention, and FIGURE 8 illustrates graphically the effect of curvature of a surface being gauged on the output of the gauge.

Figure 5:
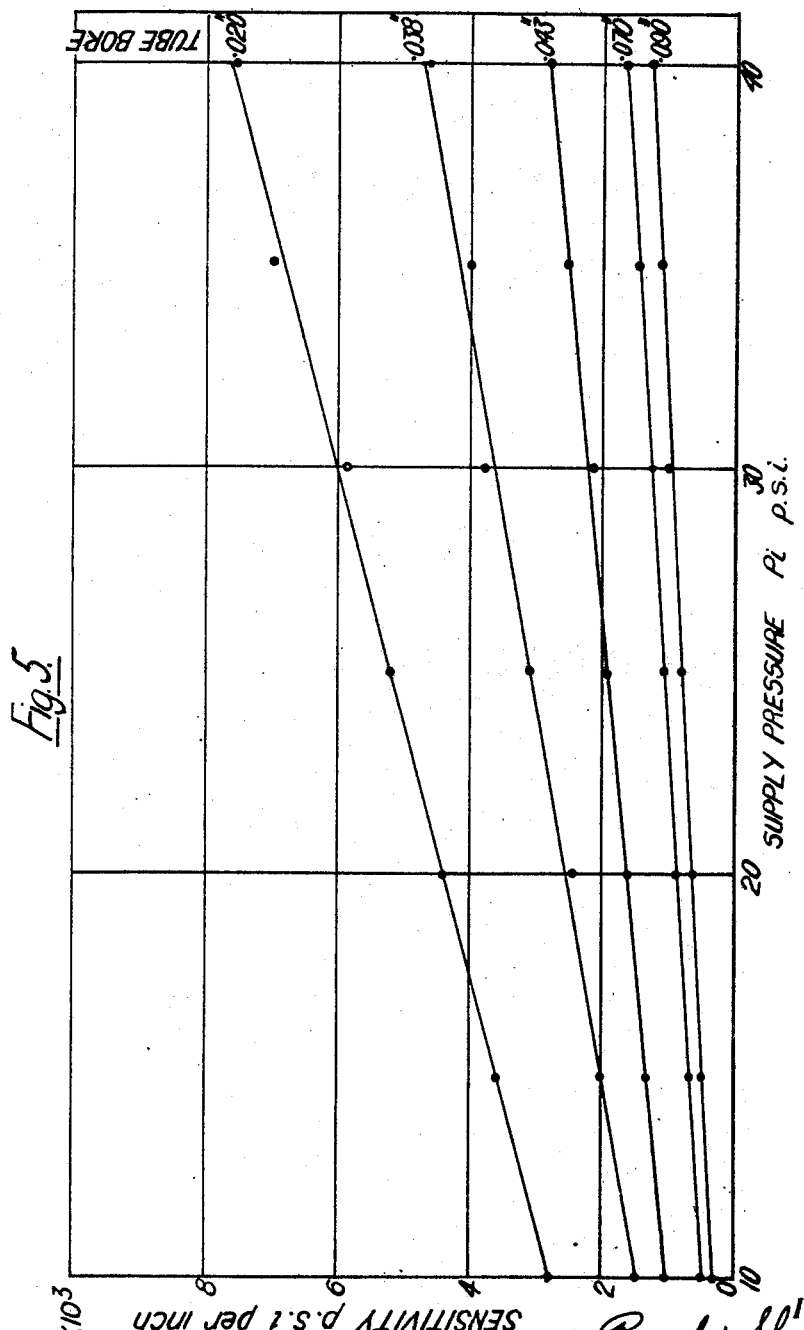

The proximity gauge (FIGURE 1) comprises capillary tube C, one end, A, of which is open to atmosphere, so that when a source of fluid (not shown) at constant input pressure $p_1$ is connected to the other end B, a fluid jet is emitted from the open end A. The fluid is most conveniently compressed air.

A capillary branch line C' incorporating a pressure responsive device P is connected to the capillary tube C at a point D therein spaced from the open end A by a distance $a$ and from the inlet end B by a distance $b$. The pressure responsive device P may be of any convenient type, and produces an electrical or other output signal which is dependent on said pressure in the capillary tube C at said point D.

In operation, the end A of the capillary tube C is placed close to the surface S of a workpiece W to be gauged, and separated therefrom by a gap $d$. The gap $d$ presents a restriction to flow of the fluid jet emited by the capillary tube C. Consequently the "back pressure" of the fluid in the capillary tube C, as measured at point D by the pressure responsive device P, will be dependent on the magnitude of the gap $d$. The pressure at point D is hereinafter referred to as the output pressure $p_o$ of the gauge.

FIGURE 2 is a diagrammatic sectional view on an enlarged scale of the part of the gauge enclosed within the chain-dotted line 2 in FIGURE 1, in which the pressure responsive device P comprises a diaphragm P' which extends sealingly across an enlarged bore E communicating with the branch line C'. An electrical pressure transducer T is attached to the side of the diaphragm P' remote from the line C', the transducer T producing an electrical output signal representative of the output pressure $p_o$.

The gauge may be used to test the dimension, shape or postion of the surface S, the readings provided by the pressure responsive device P being indicative of the instantaneous value of the gap $d$. If the workpiece W is rotating, for example, in the direction illustrated by the arrow R, the pressure responsive device P will provide an indication of irregularities in the surface S or of eccentricity of the mounting of the workpiece W.

It is desirable that the gauge should have a linear response, that is, the output pressure ofthe gauge as indicated by the pressure responsive device P should be directly proportional to the magnitude of the gap $d$. Moreover, if the gauge is to be employed to detect irregularities on surface S when the latter is moving relatively to the gauge, for example, when the workpiece W is rotating, it is important that the gauge should have a fast response. The provision of a capillary tube C assists in meeting both these requirements, since the volume of fluid between the point D at which the output pressure is measured and the open end A of the tube is relatively small.

FIGURE 4 illustrates the operating characteristics of a proximity gauge constructed and arranged as described above in which the capillary tube C had a length of 2.5 inches and a bore of 0.020 inch. In FIGURE 4 the ordinate indicates the output pressure $p_o$ in pounds per square inch (p.s.i.) as measured by the pressure responsive device P, seven curves being shown for input pressures $p_i$ increasing in steps of 5 p.s.i. from 10 to 40 p.s.i. The working fluid compressed air. The variation of the output pressure $p_o$ is plotted in each curve against the magnitude of the gap $d$, shown on the abscissa in thousandths of an inch. It will be seen that each curve is substantially linear over a given range of gaps $d$, the limits of this linear range being indicated by chain-dotted lines $L_1$, $L_2$ in FIGURE 4.

It will be seen that the extent of the linear range increases as the input pressure $p_i$ increases. Also, the mean value of this range which in practice would be the normal operating distance between the open end of the tube C and the surface S of the workpiece W, increases as the input pressure $p_i$ increases.

The sensitivity of the proximity gauge may be expressed as the change in output pressure $p_o$ produced by unit change in the gap $d$, that is, as the slope of the linear portion of the respective characteristic curve. As would be expected, the sensitivity of the gauge increases with the output pressure $p_o$, a feature shown clearly in the set of curves of FIGURE 4.

Similar characteristic curves to those of FIGURE 4 may be plotted for capillary tubes C having lengths and bores, and the effect on the operating characteristics of changes in these parameters may then be deduced.

It is found in general that the capillary bore has a marked effect on the extent of the linear range of the gauge. Thus, using a capillary tube C with a 0.020 inch bore and length of 2½ inches, the linear range is 0.0025 inch with an input pressure $p_i$ of 25 p.s.i., but using a 0.090 inch bore tube of the same length the linear range is 0.011 inch with the same input pressure. The effect of varying the input pressure $p_i$ is not so marked; thus, the linear range of a gauge having a 0.043 inch bore capillary tube varies from 0.0046 to 0.0052 inch as the input pressure $p_i$ is increased from 10 to 40 p.s.i. Similarly, the mean value of the linear range increases as the capillary bore increases; the mean range value of a gauge having a 0.020 inch bore capillary tube is 0.0022 inch for an input pressure of 25 p.s.i., but is 0.0178 inch when using a tube with a 0.090 inch bore at the same input pressure. The effect of variation of the input pressure $p_i$ on the mean range value is negligible by comparison.

The effect of changes in the capillary tube bore and the input pressure $p_i$ on the sensitivity of the proximity gauge is illustrated graphically in FIGURE 5 for a gauge having a capillary tube 2.5 inches in length. The sensitivity increases as the capillary bore decreases, and the effect of varying the input pressure $p_i$ increases as the bore decreases.

Although the main factors determining the gauge characteristics are the capillary bore and the input pressure, the length of the capillary tube C has some effect. The characteristics of gauges having tubes of different lengths are basically similar to those described above, but for shorter tube lengths the gauge sensitivity is substantially reduced for any given combination of tube bore and input pressure. Thus a gauge having a 0.020 inch bore tube and an input pressure $p_i$ of 25 p.s.i. has a sensitivity of 5.2 p.s.i. per 0.001 inch when the tube is 2.5 inches long and a sensitivity of 3.5 p.s.i. per 0.001 inch when the tube is 1 inch long, the shorter tube having a greater mean range value.

The linearity of the operating range of gauges according to the invention (i.e. between $L_1$ and $L_2$ in FIGURE 4) is found in practice to be better than 2 percent with a repeatability of 0.5 percent with capillary tubes C of larger bore (of the order of 0.090 inch) and better than 4 percent with a repeatability of 1 percent for capillary tubes C of smaller bore (of the order of 0.043 inch).

The sensitivity and the extent of the linear range of the proximity gauge increases as the distance $a$ from the open end A to the point D at which the branch line C' communicates with the capillary tube C decreases. The optimum value of the distance $a$ is in practice about 0.02 inch. Thus with the two examples given above the ratio $a:b$ is 0.25 for a 1 inch capillary tube and 0.08 approximately for a 2.5 inch capillary tube.

The performance of the gauge is little affected by the provision of an annular radially extending land F surrounding the open end A of the capillary tube (FIGURE 3) such as is provided on standard hypodermic capillary tubing, provided this land is free of burrs. An excessively large land F, however, has the effect of producing two consecutive linear regions in the output pressure $p_o$/gap $d$ characteristics (FIGURE 4), the region associated with larger gaps $d$ having a smaller slope, representing a reduced gauge sensitivity, than the other region.

Figure 6:
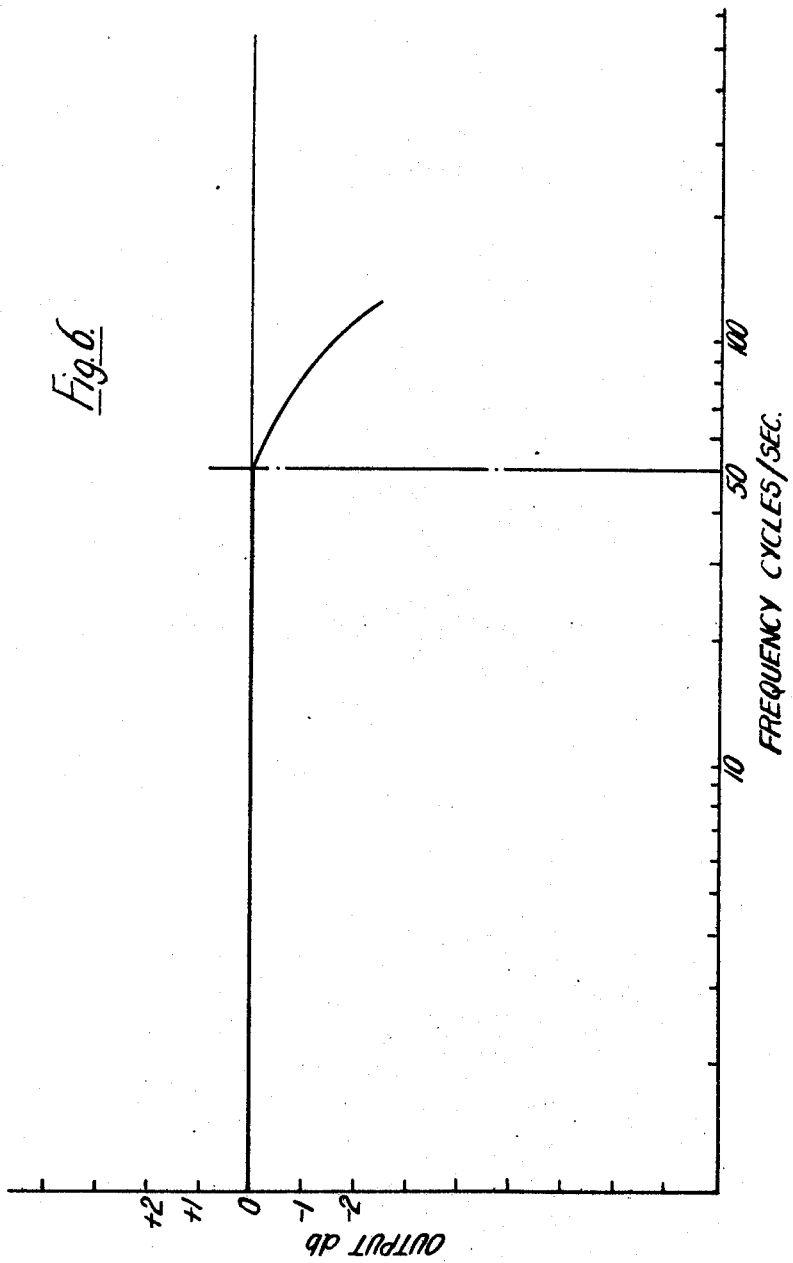
FIGURE 6 is a graph illustrating the frequency response of a gauge according to the invention.

FIGURE 6 illustrates graphically the frequency response of the proximity gauge and is therefore indicative of the speed of response of the gauge to changes in the gap $d$. The frequency plotted in cycles per second on the abscissa is the frequency $f$ of change of the gap $d$, for example, due to the passage of irregularities in the surface S beneath the open end A as the workpiece W rotates. The relative changes in the output pressure indicated by the pressure responsive device P due to an irregularity in the surface S of a given size is expressed as a relative gain in decibels on the ordinate. It will be seen that the relative gain is substantially uniform up to a maximum, or cut-off frequency $f_m$, above which the gain begins to fall away rapidly, indicating that the fluctuation of the gap $d$ is too rapid to be followed by the gauge.

FIGURE 7 is a table giving values of the maximum or cut-off frequency $f_m$ for a gauge having a capillary tube C of length 2.5 inches at two different input pressures $p_i$ for tubes of different bore. The values shown in FIGURE 7 were obtained using a pressure transducer T having a diaphragm P' of diameter of ⅝ inch. The frequency response can be improved by reducing the sampling volume of air between the transducer T and the point D. The volume of air in the length $a$ of capillary tube between the end A and the point D is significant only with larger bore tubes; with tubes of larger bore the cut-off frequency is through the tube.

The sampling volume can be reduced conveniently by reducing the diameter of the pressure transducer T: for example, if a miniature transducer T having a 7/32 inch diaphragm P' is employed the cut-off frequencies $f_m$ for a tube of 0.02 inch bore 2.5 inches long at input pressures $p_i$ of 10 and 40 p.s.i. respectively are increased to 40 and 35 c./s. respectively. The frequency response of the smaller bore tubes can be further improved by reducing the length of the tubes, which again has the effect of increasing the air flow. For example if the length of the tube referred to above were reduced to 1 inch the cut-off frequencies $f_m$ at input pressures $p_i$ of 10 and 40 p.s.i. respectively would be 50 and 45 c./s. respectively. The sampling volume for the ⅝ inch and 7/32 inch diameter pressure transducers is approximately $10^{-2}$ and $10^{-3}$ cubic inch respectively, this volume comprising that of the short diameter about 60% of the bore of the capillary tube C, and that of the bore E between the diaphragm P' and the line C', typically about 0.02 inch in length.

It is found that the proximity gauge according to the invention is also relatively unaffected by dirty working conditions. Thus the presence of, for example, cooling fluid on the surface S is found to have little effect on the measurements effected, by virtue of the small area of impingement of the fluid jet on the surface S. The fact that this area is relatively small is, it will be appreciated, also conducive to greater accuracy, since the instantaneous value of the output pressure is relatively less affected by curvature of the surface S.

The error introduced into the proximity gauge output by virtue of the curvature of the surface S is illustrated graphically in FIGURE 8, for gauges having capillary tubes C of different bore diameters, as indicated. The error decreases rapidly with increase in the diameter of the workpiece W and decrease in the capillary bore.

The output pressure $p_0$ of the proximity gauge according to the invention is not appreciably affected by workpiece rotation, at least up to peripheral workpiece speeds of 100 ft./sec.

The pressure responsive device P may alternatively comprise a fluid jet element, as defined above. Thus the bleed line C' could communicate with one of the control passages of a fluid jet element, so that the pressure at said point in the capillary tube C acts as a control pressure of the fluid jet element.

We claim:

1. A proximity gauge comprising a capillary tube having an open end which may be spaced from a surface to be gauged, the said capillary tube including a bore having a diameter within the range of from about 0.01 inch to about 0.09 inch, means for supplying fluid under pressure to said capillary tube to direct fluid on to said surface through said open end, and pressure responsive means connected to said capillary tube and adapted to indicate the fluid pressure or changes in the fluid pressure at a predetermined point in said capillary tube.

2. A gauge as claimed in claim 1 in which said predetermined point is disposed adjacent the open end of the capillary tube.

3. A gauge as claimed in claim 1 in which an annular flange is provided on the open end of the capillary tube, said annular flange being disposed in a plane perpendicular to the axis of the capillary tube and surrounding the said open end thereof.

4. A gauge as claimed in claim 1 in which there is provided a relatively short branch line formed of capillary tubing through which the pressure responsive means communicates with the capillary tube at said predetermined point.

References Cited

UNITED STATES PATENTS

| | | | |
|---|---|---|---|
| 2,846,871 | 8/1958 | Worthen | 73—37.9 |
| 3,046,778 | 7/1962 | Fortier | 73—37.5 |
| 3,317,039 | 5/1967 | Wadey | 73—37.7 XR |

LOUIS R. PRINCE, Primary Examiner

WILLIAM A. HENRY II, Assistant Examiner